Jan. 3, 1928.
A. J. DOTTERWEICH
1,654,537
APPARATUS FOR SOFTENING WATER
Filed March 3, 1925  3 Sheets-Sheet 1
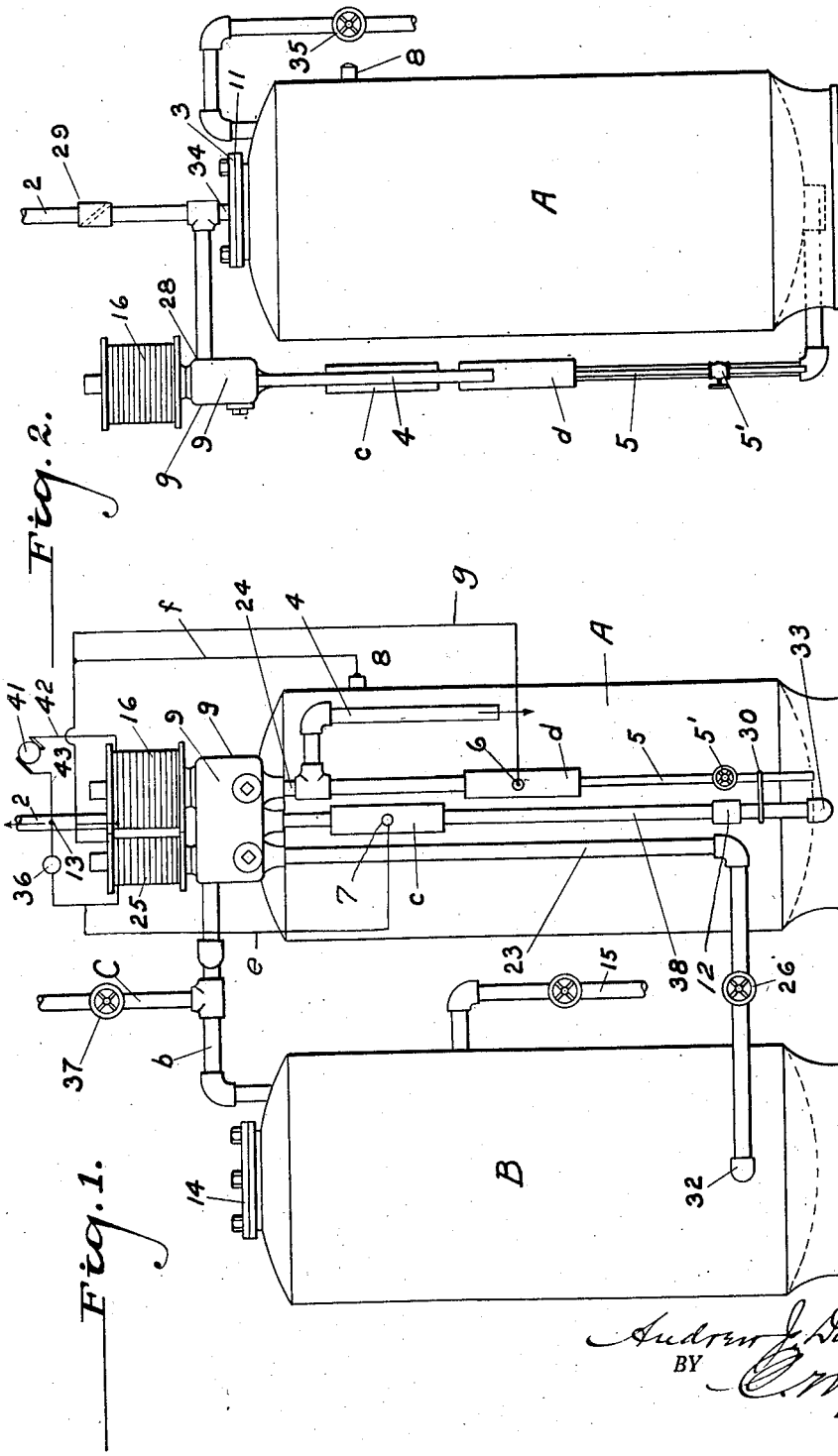
INVENTOR.
Andrew J. Dotterweich
BY
ATTORNEY Jan. 3, 1928.
A. J. DOTTERWEICH
1,654,537
APPARATUS FOR SOFTENING WATER
Filed March 3, 1926    3 Sheets-Sheet 2
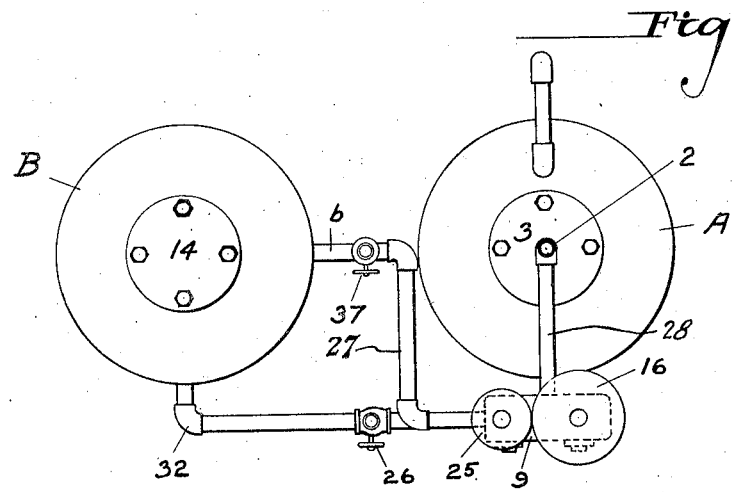
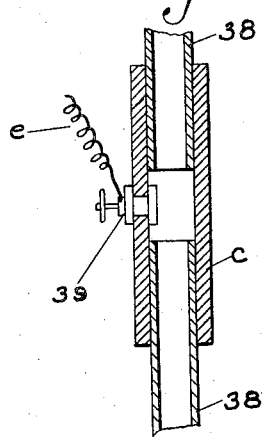
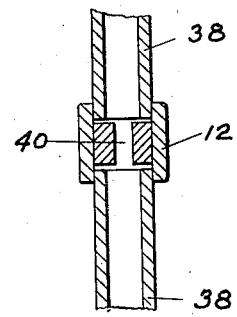
INVENTOR.
Andrew J. Dotterweich
BY
O. M. Clarke
ATTORNEY Jan. 3, 1928.
A. J. DOTTERWEICH
1,654,537
APPARATUS FOR SOFTENING WATER
Filed March 3, 1925   3 Sheets-Sheet 3
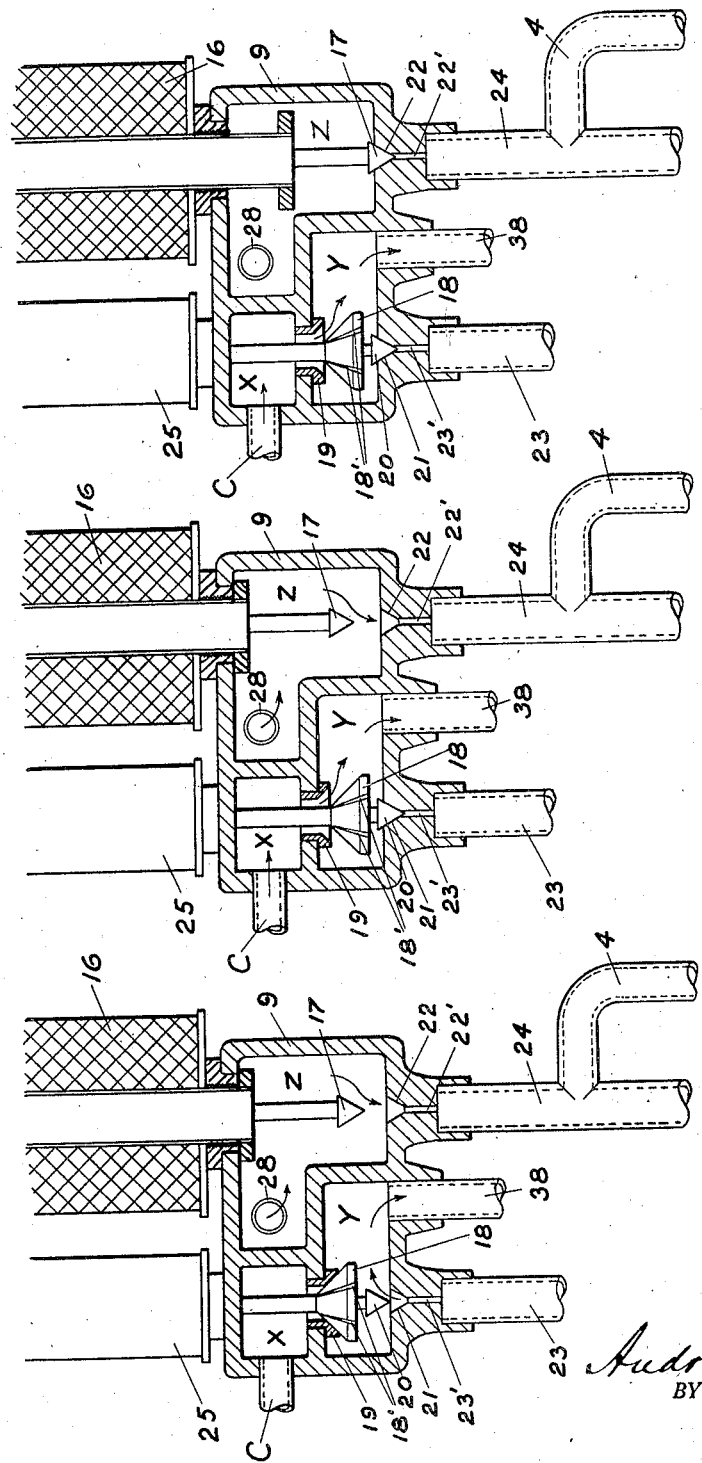
INVENTOR.
Andrew J. Dotterweich
BY
C. M. Clarke
ATTORNEY Patented Jan. 3, 1928.

1,654,537

UNITED STATES PATENT OFFICE.

ANDREW J. DOTTERWEICH, OF PITTSBURGH, PENNSYLVANIA.

APPARATUS FOR SOFTENING WATER.

Application filed March 3, 1926. Serial No. 91,939.

My invention relates to improvements in apparatus for softening water, and especially of that type utilizing a material such as zeolite, capable of being regenerated.

The improvements here involved refer particularly to the valve mechanism, and provide means for controlling the circulation through the softening medium or chamber whereby the several operations of softening, regenerating the zeolite, and washing or cleaning subsequent to regeneration, with resumption of softening, all performed in due sequence.

Heretofore these operations have been performed by mechanically operative mechanism involving the use of hand or power applied means, usually within the judgment and control of the operator.

In my present invention I utilize electrically actuated valves for establishing the desired circulation, with automatically operative circuit opening and closing means dependent on the circulation of the liquid, for effecting the valve operations.

The object in view is to simplify the construction and operation so that it will be capable of operation after an initial current application for operating the brine circulation controlling valve, for complete regeneration of the softening mineral.

One preferred embodiment of the invention is shown in the accompanying drawings in which,—

Fig. 1 is a view in front elevation of a water softening apparatus embodying my invention.

Fig. 2 is a view in side elevation of the water softening tank and connections.

Fig. 3 is a plan view of Fig. 1.

Fig. 4 is an enlarged sectional detail view through the valve chambers and connected parts, showing the valves opened for circulation of brine water to the softener and therefrom to the waste.

Fig. 5 is a similar view showing the brine circulation valve closed and the raw water supply valve and waste water valve open.

Fig. 6 is a similar view, showing the brine and waste valves closed, for raw water circulation through the softener.

Figs. 7 and 8 are sectional detail views of portions of the conduit leading to the softening chamber.

The main chamber A, of well known construction, contains the softening material, as zeolite, through which the raw or hard water is circulated in the usual manner.

As is well understood in the art, and as practiced by me in carrying out the operation disclosed in prior application filed May 19, 1925, Serial No. 31,313, the several attendant operations are performed in proper sequence. These in the order of their performance, are ordinarily, (a) Softening, i. e. passing the hard water through the contained body of zeolite.

(b) Backwashing, i. e. passing hard water upwardly or in reverse flow through the zeolite, for cleaning and breaking up of the mineral, and thence to the drain as waste.

(c) Salting, i. e. passing hard water with a contained brine solution through the zeolite and thence to the drain.

(d) Reflushing, by passing fresh water through the softening chamber and zeolite and outwardly to the drain.

The several sequential steps comprise a cycle of operations from the commencement of the softening treatment to the removal of the salt water from the zeolite. In the present case, backwashing is performed by manual operation of a valve providing upward flow through the softening material of raw water and thence to a drain, as long as necessary.

The ordinary flow of hard water for softening is upwardly through the softening tank under normal pressure of the main, as the water is drawn from the delivery pipe system.

The operations of (c) Salting and (d) Reflushing are effected by upward circulation through the zeolite for limited periods, under the control of circulation regulating valves which are actuated by solenoid magnets.

These are energized by circuits which are opened primarily by a positively established switch-controlled circuit and kept open sufficiently long to effect flow of raw water through the brine tank, and thence into the softening chamber for regeneration.

Thereafter the circulation of raw water for softening, with the incident of backwashing, is accomplished in the usual way.

Referring to the drawings, A is the softening tank located in convenient relation to the brine tank B for direct connection and circulation through the connecting pipe and valve system shown.

Brine tank B is provided with a closed top or cover 14 of ample size for introduction of salt from time to time, and is tightly clamped by securing bolts, as shown. Said tank is provided with a main raw water supply pipe C having a branch $b$ leading to the top of the tank and a branch 27 leading to valve box 9, through which the water circulates or is supplied to the softener chamber A, as hereinafter described.

Tank B is also provided with a valve-controlled outlet pipe 15 for drawing off water therefrom when refilling the tank with salt, valve 37 being closed.

Valve box 9, which is located at the upper front portion of softener tank A, is connected by pipe 23 with tank B at 32 for supply of brine water under control of regulating valve 26. Pipe 23 communicates with chamber Y of valve box 9 through reduced port 23′ having a valve seat 21 for closure by valve 20 at the lower end of the stem of a solenoid magnet 25.

Said stem is also provided with an upwardly seating valve 18 having a series of radial leakage ports 18′, so that when the valve is seated upwardly against bushing 19 there will be a limited flow of fresh water from pipe C through chambers X and Y. Chamber Y of the valve box communicates by a pipe 38 with the lower end of the softener chamber A, as at 33.

Pipe 38 is provided with a section $c$ of insulating material, as rubber tubing, connecting the separated ends of pipe 38, as in Fig. 6, for continuous flow.

Tube $c$ is provided with an electrode 39 for connection with the main circuit as hereinafter described.

Pipe 38 is provided with a choke nozzle 12, at its lower portion, as in Fig. 8. Such nozzle consists of a coupling having a reduced middle circulation port 40, whereby to retard the flow of water to the softening chamber A so as to regulate the pressure therein with relation to an outlet check valve 29 of delivery line 2, during flow of waste water from the softener chamber.

The valve box 9 is also provided with a separate chamber Z communicating by pipe 28 with the delivery pipe 2 above the top of chamber A. Said delivery pipe is connected at 34 with a cover plate or manhole closure 3 secured to the top of the tank by bolts, and provided with an intervening filter screen 11 to screen the outgoing water from foreign matter, etc.

Chamber Z of the valve box communicates by valve seat 22 and reduced port 22′ with a main drain pipe 24 having a drain delivery terminal 4 at one side leading to a sewer or any disposition point. Below its connection with pipe 4, pipe 24 is provided with an insulating connection $d$, similar to connection $c$ and having a similar electrode 6 connected with the circuit by conductor $g$, operating as hereinafter described.

Below such insulating connection is an auxiliary drain pipe 5 of reduced diameter having a controlling valve 5′ and a holding bracket 30 by which it is mounted on pipe 38. The auxiliary drain pipe is designed to deliver a retarded flow of brine water of decreasing strength, as hereinafter described.

A valve 17 for valve seat 22 is mounted at the lower end of the actuated stem of a solenoid magnet 16, similar to magnet 25, and fixedly mounted above the valve box 9, as shown in Figs. 4, 5 and 6. Such magnets, which are of well known construction, are provided with armatures surrounding the vertically movable stems, for actuation of the valves in opening upwardly, the valves closing downwardly upon termination of the current, as is usual in such form of magnet. The magnets are wired in series with a generator or battery 41 by leads 42, 43, having at one side a ground connection 13 as with soft water delivery pipe 2, and a controlling switch or button 36 for closing the circuit in the usual way.

Tank A is also provided with a fixed electrode 8 connected with the circuit by conductor $f$ for short circuiting the current from the brine valve coil 25, operating as hereinafter described.

For the purpose of backwashing the softening tank A, it is provided with an outlet valve-controlled pipe 35 by which backwashing may be performed manually upon closing the supply pipe 2 against flow and opening the valve of the main raw water supply line and the valve of pipe 35. Backwashing does not, however, involve any portion of the present invention.

The apparatus is mounted on a suitable floor or support by the base of each tank, which are connected by and support the above described mechanism.

In operation, switch 36 is closed for a limited period of time sufficient to energize solenoid magnets 16 and 25 to open valves 17 and 20, and seating the by-pass valve 18 against bushing seat 19, as in Fig. 4.

Valve 37 being opened, raw water will pass from main supply line C through branch connection $b$ to brine tank B and connection 27 to valve box 9. With the brine tank filled to a suitable height with salt, the raw water passes downwardly through it, becoming impregnated, and brine water passes from the bottom by pipe 32 through opened valve 26 and pipe 23 to throttled port 23′ of valve seat 21 to chamber Y.

At the same time, a limited amount of raw water from connection 27 passes by grooves 18′ of valve 18 from valve chamber X to chamber Y, for diluting admixture with the brine. The mixture then passes downwardly through the tubular connection *c* of insulating material, and by pipe 38 and choke nozzle 12 to connection 33 at the bottom of the softener tank A.

With check valve 29 of the soft water outlet pipe 2 closed against internal pressure, the flow being restricted by the choke nozzle 12, and the sewer discharge 28—24 being open, brine water passes by pipe 28 to chamber Z of the valve box 9. Valve 17 of port 22 being held open by the magnet 16 while same is energized, the brine water passes by throttled port 22′ to pipe 24 and branch pipe 4 to the main drain or waste.

Below the main drain connection 4, pipe 24 is also provided with a section of insulating tubing *d* like section *c*, below which is a small auxiliary drain pipe 5 having an outlet controlling valve 5′ and a supporting bracket connection 30 with pipe 38.

Insulating section *c* is provided with an electrode, as a binding post connection 39 extending into the circulating cavity, so that when the brine water reaches such point in its downward circulation, the main circuit becomes grounded through lead wire *e* and the brine as a conductor, and pipe 38.

Thereupon, switch 36 may be opened and the circuit will be continued until the brine ceases to flow.

To effect such cessation, an electrode 8 is located in the upper wall of softener tank A, extending into the cavity and connected by lead wire *f* with the main circuit.

As the brine rises through the zeolite up to electrode 8, it will then short circuit the coil of magnet 25 so that it is de-energized. Thereupon valve 20 will seat, closing off further circulation of brine to the softener A, as in Fig. 5.

In order, however, to ensure completed drainage of brine water from the softener, it is desirable to maintain valve 17 open for a sufficiently long period for complete drainage, with raw water continuing to flow by pipe 27, chamber X, past open valve 18, chamber Y, and pipes 38 and connection 33. With main drainage passing through pipe 4 until substantially clear of brine, there will be retained for a short period a gradually weakening brine solution in pipe 24 below connection with pipe 4 and through insulating connection *d*, due to the throttled outlet auxiliary drain pipe 5.

When the solution becomes too weak to act as a conductor, electrode 6 and lead wire *g* cease to transmit current, so that coil 16 is de-energized and valve 17 will seat, closing port 22, as in Fig. 6.

Both ports 21 and 22 now being closed, the brine supply is cut off, and all surplus and used brine is drained away. The softener being now in condition for use and with valve 37 open, raw water will pass upwardly through the softener and check valve 29 whenever line 2 is opened for supply.

I claim:

1. In a water softening apparatus having a brine tank and a softening tank and a circulating system of piping therefor, valve mechanism therefor consisting of a valve box having a fresh water inlet chamber, a brine water chamber, and a waste water chamber, a fresh water conduit connected to the fresh water chamber, brine water pipes adapted to connect the brine water chamber with the brine tank and the softening tank respectively, a softening tank conduit connected with the waste water chamber, a waste water conduit leading from the waste water chamber, a valve controlling flow through the brine water chamber, a valve controlling flow through the waste water chamber, magnets for actuating said valves, and a switch controlled circuit for said magnets.

2. In a water softening apparatus having a brine tank and a softening tank and a circulating system of piping therefor, valve mechanism therefor consisting of a valve box having a fresh water inlet chamber, a brine water chamber, and a waste water chamber, a fresh water conduit connected to the fresh water chamber, brine water pipes adapted to connect the brine water chamber with the brine tank and the softening tank respectively, a softening tank conduit connected with the waste water chamber, a waste water conduit leading from the waste water chamber, a valve controlling flow through the brine water chamber and from the fresh water chamber to the brine water chamber, a valve controlling flow through the waste water chamber, magnets for actuating said valves, and a switch controlled circuit for said magnets.

3. In a water softening apparatus having a brine tank and a softening tank and a circulating system of piping therefor, valve mechanism therefor consisting of a valve box having a valve adapted to control circulation from the brine tank to the softening tank and a valve adapted to control circulation from the softening tank to a waste pipe, magnets for actuating said valves, and a switch controlled circuit for said magnets including a short circuiting connection with the pipe system providing for circulation from the brine tank to the softening tank and from the softening tank to the drain, whereby both magnets are retained in the circuit when the switch is opened.

4. In a water softening apparatus having a brine tank and a softening tank and a circulating system of piping therefor, valve mechanism therefor consisting of a valve box having a valve adapted to control circulation from the brine tank to the softening tank and a valve adapted to control circulation from the softening tank to a waste pipe, magnets for actuating said valves, and a switch controlled circuit for said magnets including a short circuiting connection with the softening tank, whereby the magnet for the first valve is de-energized and the magnet for the second valve is retained in the circuit.

5. In a water softening apparatus having a brine tank and a softening tank and a circulating system of piping therefor, valve mechanism therefor consisting of a valve box having a valve adapted to control circulation from the brine tank to the softening tank and a valve adapted to control circulation from the softening tank to a waste pipe, magnets for actuating said valves, an energizing circuit therefor, and an electrode in the softening tank connected with said circuit for short circuiting the magnet of the valve for controlling circulation from the brine tank to the softening tank whereby the magnet for one valve is de-energized and the magnet for the other valve is retained in the circuit.

6. Valve mechanism for controlling the circulation of fluid in a water softening apparatus comprising a casing enclosing a water inlet chamber and a brine chamber with an intervening valve port, brine conduits connected with the brine chamber, a waste chamber having an inlet and an outlet conduit, a compound valve controlling flow from the water inlet chamber to the brine chamber and from one of the brine conduits to the brine chamber, a valve controlling circulation through the waste chamber, and means for actuating said valves.

7. Valve mechanism for controlling the circulation of fluid in a water softening apparatus comprising a casing enclosing a water inlet chamber and a brine chamber with an intervening valve port, brine conduits connected with the brine chamber, a waste chamber having an inlet and an outlet conduit, a compound valve controlling flow from the water inlet chamber to the brine chamber and from one of the brine conduits to the brine chamber, a valve controlling circulation through the waste chamber, and a separate actuating magnet for each of said valves.

8. Valve mechanism for controlling the circulation of fluid in a water softening apparatus comprising a casing enclosing a water inlet chamber and a brine chamber with an intervening valve port, brine conduits connected with the brine chamber, a waste chamber having an inlet and an outlet conduit, a valve stem having a valve controlling circulation from the water inlet chamber to the brine chamber and a valve controlling flow from one of the brine conduits to said chamber, a valve controlling stem having a valve circulation through the waste chamber, and a separate actuating solenoid magnet for each of said valve stems.

9. Valve mechanism for controlling the circulation of fluid in a water softening apparatus comprising a casing enclosing a water inlet chamber and a brine chamber with an intervening valve port, brine conduits connected with the brine chamber, a waste chamber having an inlet and an outlet conduit, a valve stem having a channelled valve controlling circulation from the water inlet chamber to the brine chamber with either full or limited flow and a valve controlling flow from one of the brine conduits to said chamber, a valve stem having a valve controlling circulation through the waste chamber, and a separate actuating solenoid magnet for each of said valve stems.

In testimony whereof I hereunto affix my signature.

ANDREW J. DOTTERWEICH.